July 14, 1953  H. F. REEVES, JR  2,645,658
PREPARATION OF ALKYL ESTERS OF ACONITIC ACID
Filed Feb. 21, 1949
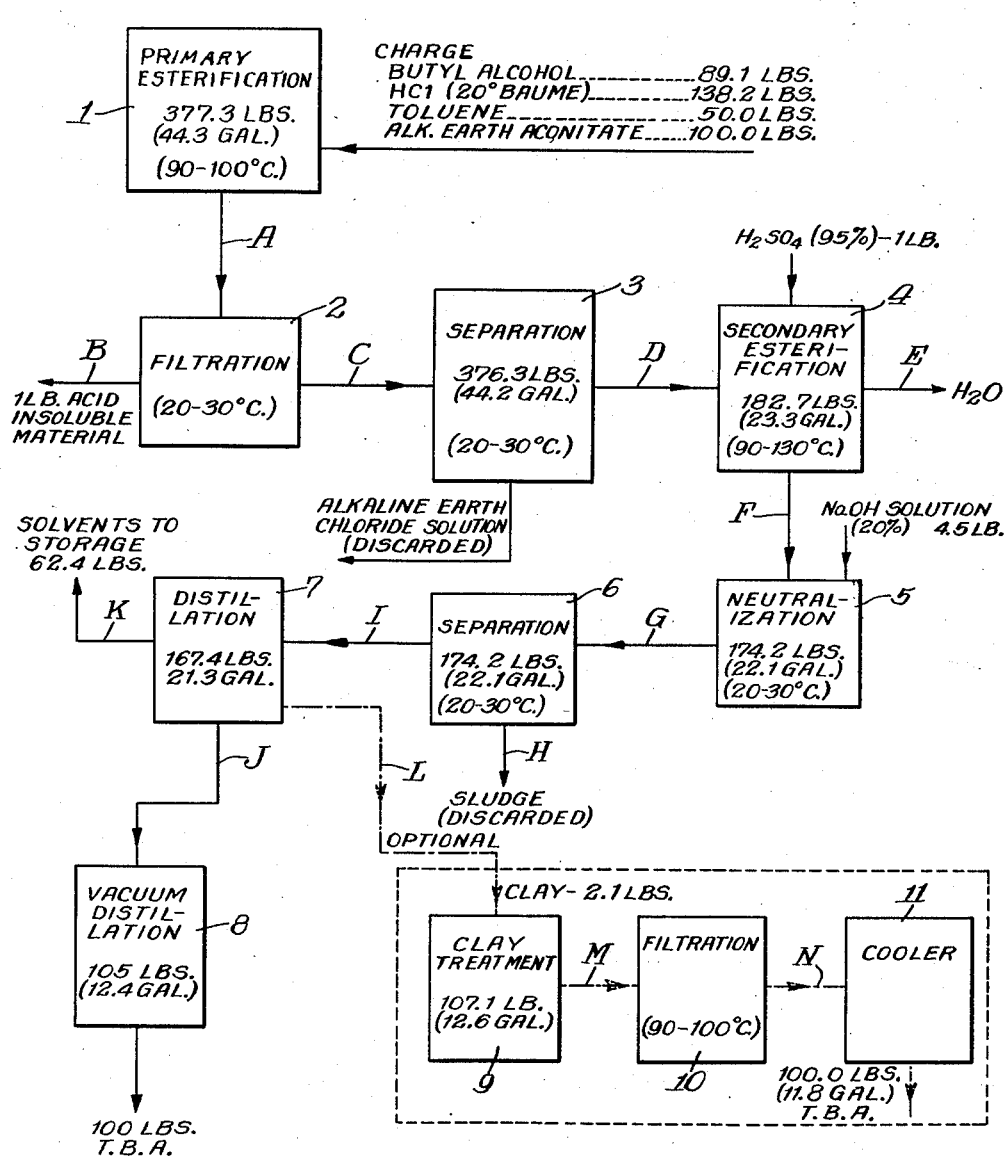
INVENTORS.
Howard F. Reeves Jr.,
BY Salem F. Belt,
Brown, Jackson, Boettcher & Dienner
Attys.

Patented July 14, 1953

2,645,658

UNITED STATES PATENT OFFICE 2,645,658

PREPARATION OF ALKYL ESTERS OF ACONITIC ACID

Howard F. Reeves, Jr., Chattanooga, Tenn., assignor to Morton Salt Company, Chicago, Ill., a corporation of Illinois Application February 21, 1949, Serial No. 77,662

10 Claims. (Cl. 260—485)

This invention relates, generally, to a new and useful process of preparing esters of aconitic acid from the alkaline earth salts of aconitic acid, and the process has particular application to the direct preparation and recovery of substantially pure esters of aconitic acid from crude alkaline earth aconitates, such as are obtained by treating hot sugar cane molasses with an alkaline earth salt solution, without intermediate separation of aconitic acid.

Aconitic acid occurs in certain plant juices, for example, sorgo juice, cane juice and sugar beet juice. It may be present in such juices both as a free acid as well as in the form of alkaline earth metal salts, principally the calcium and magnesium salts. A satisfactory method of preparing the alkaline earth aconitates from plant juices and a description of their general properties are given by Ambler, J. A., Roberts, E. J. and Weissborn, F. W., Jr., U. S. D. A., Agri. Chem. Res. Div., New Orleans, La., AIC 132 (1946).

In general, the alkaline earth aconitates are obtained by treating hot sugar cane molasses at a pH of about 6–7 with an alkaline earth chloride solution. The crude alkaline earth aconitate separates out as a calcium-magnesium salt. These precipitates may be separated from the molasses by filtration and washed and dried.

The impure or crude alkaline earth aconitate thus obtained will vary considerably in specific composition depending primarily upon the particular source thereof. However, in general, such impure aconitate precipitates will have the following composition:

| | Per cent by weight |
|---|---|
| Aconitic acid | 50–60 |
| Ca-Mg (total) | 17–21 |
| Acid insolubles | 0.4–10 |
| Water | 20–30 |

Typical specific types of crude or impure alkaline earth aconitates have the following composition:

| | Sample 1—percent by weight | Sample 2—percent by weight |
|---|---|---|
| Aconitic acid | 54 | 58. |
| Ca | 15 | 17.6. |
| Mg | 3.5 | 2.5. |
| Acid Insoluble | 3.8 | .4. |
| Water | balance | balance. |

The process of the present invention is generally useful in the direct preparation of aconitic esters from impure alkaline earth aconitate of the type described above without intermediate isolation of aconitic acid.

The object of the present invention, generally stated, is the provision of a direct, efficient, practical, and economical process of preparing from alkaline earth aconitates, and particularly from the impure concentrates thereof obtained from plant juices, and without intermediate isolation of aconitic acid, substantially pure esters of aconitic acid wherein the alcoholic alkyl radicals contain from three to twelve carbon atoms.

An important object of the present invention is the process of preparing substantially pure esters of aconitic acid from alkaline earth aconitates as obtained in the crude or impure form, which comprises digesting the alkaline earth aconitate concentrate in a mixture of either hydrochloric or sulphuric acid and a primary alcohol containing three to twelve carbon atoms thereby effecting liberation in the mixture of aconitic acid and partial esterification thereof and simultaneous formation of alkaline earth salts of the mineral acid used, mechanically separating the solution of aconitic acid and aconitic esters in the alcohol from the alkaline earth salts of the mineral acid which are practically insoluble therein, and substantially completely esterifying the residual content of the aconitic acid in the alcoholic solution, and recovering the aconitate ester contents therefrom.

Still another important object of the present invention is the provision of a process of preparing substantially pure aconitic acid esters from an impure concentrate of alkaline earth aconitates which comprises digesting the impure concentrate in a mixture of a primary alcohol having from three to twelve carbon atoms, either hydrochloric or sulphuric acid, and a hydrocarbon solvent, other than styrene, having a boiling point within the range of 65–150° C., filtering or otherwise separating any acid insoluble materials or other precipitate from the resulting reaction mass thereby allowing the mass to separate in an upper layer and a lower layer, the upper layer containing the alcoholic-hydrocarbon solvent solution of aconitic acid and some aconitic ester and the lower layer containing in aqueous solution the alkaline earth salt of the mineral acid used in the digestion step, separating the alcoholic-hydrocarbon solvent layer, completing the esterification of the free aconitic acid content thereof, and processing the resulting solution to obtain substantially pure aconitic ester therefrom.

Certain other objects of the invention will, in part, be obvious as will appear hereinafter.

For a more complete understanding of the nature and scope of the present invention, reference may now be had to the following detailed description thereof taken in connection with the accompanying drawing which contains a flow sheet of a preferred embodiment of the invention.

For convenience, this preferred embodiment of the invention will be described in detail in connection with the accompanying flow sheet, and thereafter, a number of modifications of the preferred process will be described.

EXAMPLE I

A three-necked flask is equipped with a thermometer, an agitator, and reflux condenser. 356 grams of n-butyl alcohol (25% in excess of theoretical), 552 grams of 20° Baumé hydrochloric acid (25% in excess of theoretical) and 200 cc. of toluene are added to the flask. With agitation, 400 grams of alkaline earth aconitate obtained from sugar cane molasses and containing the equivalent of 56% aconitic acid are added. The reaction mixture is heated at its reflux temperature (94–97° C.) for 85 minutes with continued agitation.

The mixture is cooled and then filtered under reduced pressure through a Buchner funnel containing a thin layer of diatomaceous filter aid. The filtered mixture is then placed in a separatory funnel and allowed to separate into two layers. The lower aqueous solution (specific gravity 1.6) weighing approximately 745 grams is drawn off and discarded. This lower layer contains alkaline earth chloride, excess hydrochloric acid, water, and traces of alcohol and aconitic acid. The upper layer weighing 730 grams (specific gravity 0.94 acidity—1 cc.=7.7 cc. of N/4 NaOH) is added to a reaction flask equipped with a side decanter and thermometer, and 4 cc. of 95% sulphuric acid are added. The mixture is heated and water is drawn from the side decanter as formed until the flask contents temperature rises to approximately 130° C. The reaction requires from 70 to 90 minutes. The temperature will continue to rise to about 132° C. if time of heating is prolonged. At the end of this reaction period a sample of the flask contents titrates as follows: 2 cc.=1.891 gm.=1.3 cc. N/4 NaOH.

35 cc. of water were withdrawn from the decanter during the reaction. After cooling, the mixture weighing 690 grams is placed in a flask equipped with an agitator and 34 grams of 17% NaOH solution (25% excess of quantity determined by the above titration) are added slowly. The mixture is agitated five minutes and is then transferred to a separatory funnel and allowed to stand for two hours. A dark colored sludge collects or separates as a lower layer and is discarded. The upper layer is added to a distilling flask and the toluene and unreacted alcohol solvents are recovered therefrom by distillation. The condensed solvents can be reused in the next run.

The crude ester weighing 436 grams (99.1% of theoretical) is then distilled under reduced pressure and 425 grams of distilled ester are obtained. The product obtained is essentially the tri-n-butyl ester of aconitic acid. This product is particularly useful as a plasticizer.

When the crude or raw alkaline earth aconitate is of high grade, the crude ester may be treated with 2% of an absorbent clay for 30 minutes at 100° C. with agitation, as an alternative to the purification by distillation under reduced pressure. However, in general, this treatment does not improve the color of the product as well as it can be improved by distillation under reduced pressure.

Referring now to the flow sheet, there will be described in connection therewith the application of the preferred process to the processing a 377.3 pound batch of raw alkaline earth aconitates so as directly to esterify the aconitic acid content without isolating the aconitic acid. Step 1 is a primary esterification step for the raw alkaline earth aconitate.

The particular technique of charging the digester in Step 1, apparently, is not critical. It is preferred, however, to first mix the alcohol, acid and toluene together and then add the raw alkaline earth aconitate. This particular technique has the advantage that the viscosity of the mixture during the first stages of the process is greatly reduced and enables the use of concentrated acid and a lower excess of alcohol. After the charge in the reaction vessel is completely introduced, the agitation thereof is continued and heat is applied, the preferred temperature for reaction being within the range of 90–100° C. During the primary esterification step, the hydrochloric acid forms chlorides with the alkaline earth components. A portion of the aconitic acid formed on hydrolysis is esterified by the alcohol. The primary esterification stage is advantageously terminated after the reaction of the aconitate with the hydrochloric acid is substantially complete.

The contents of the reaction vessel are cooled and discharged through line A into a filter wherein insolubles in the reaction mass are filtered out in Step 2. The acid insolubles are discharged through line B and the filtrate is discharged through line C into a separator in which the filtrate is permitted to separate into two layers in the separation Step 3. The lower layer containing alkaline earth chloride and excess acid in aqueous solution is drawn off and the upper alcoholic layer containing the aconitic acid and aconitic esters is drawn off and delivered through line D into secondary esterification apparatus. The filtration Step 2 and the separation Step 3 may advantageously be carried out at approximately room temperature, i. e. 20–30° C., as indicated, although a range of 10–120° C. is useful.

In the secondary esterification Step 4, concentrated sulphuric acid, or other acidic catalyst, is added to catalyze the esterification of the aconitic acid remaining in the alcoholic solution. The water formed by the esterification is discharged through line E. After esterification, the alcoholic solution containing the ester is discharged through line F into a neutralization tank wherein the neutralization Step 5 is carried out to neutralize the acid catalyst and any unreacted aconitic acid that may remain. As indicated, a 20% solution of NaOH may be used for neutralization. The neutralized solution is delivered through line G into a separator wherein the sludge formed upon neutralization is allowed to separate in Step 6 and is discharged to waste through line H. The sludge-free solution from Step 6 is delivered through line I to suitable distillation equipment for the distillation Step 7 in which alcohol and toluene are distilled off from the solution so as to leave the higher boiling crude ester which is discharged through line J into suitable equipment for the vacuum distillation Step 8. The solvents driven off in the distillation Step 7 are discharged through line K and are condensed and delivered to a solvent storage for reuse in subsequent batches. The distilled product from the vacuum distillation Step 8 is condensed and collected as the finished product, and consists substantially entirely of the tri-butyl ester of aconitic acid.

When high grade alkaline earth aconitates are being processed, satisfactory decolorization of the crude aconitate ester from Step 7 may be obtained by treatment of the same with absorbent clay. This alternative decolorizing and purifying step is indicated in broken outline in the flow sheet. Thus, the crude ester may be discharged through line L into suitable mixing equipment for the treatment Step 9 with the absorbent clay. The slurry formed with the clay is discharged through line M to suitable filtration equipment wherein the clay is filtered out in a filtration Step 10. It will be noted that the filtration step is carried at a temperature of 90–100° C. The filtrate is discharged through line N into a cooler in which the filtrate is cooled in Step 11.

Table 1 below gives the compositions of raw alkaline earth aconitate from three different sources which have been processed in accordance with the procedure set forth above in connection with the flow sheet:

*Table I*

| Source | Percent Aconitic Acid | Percent Acid Insolubles | Percent Sugar |
| --- | --- | --- | --- |
| G | 56.5 | 0.5 | .90 |
| GW [1] | 56 | 0.5 | Traces |
| SC | 45–46 | 9.0 | .60 |
| N. I | 54 | 4 | .10 |

[1] GW represents G aconitate that was washed to remove soluble sugars.

The hydrochloric acid used in the process may be 20° Bé. commercial grade and n-butyl alcohol of technical grade has been found to be satisfactory.

It is apparent that the specific process described above in connection with the flow sheet is subject to numerous modifications, and in order that there may be a fuller understanding of the nature and scope of the invention a number of these modifications will be discussed for purpose of illustration.

STEP 1.—PRIMARY ESTERIFICATION

The preferred temperature range at atmospheric pressure is from 95°–100° C., although the range may extend from 85°–120° C. However, temperatures up to about 150° C. may be employed in conjunction with super-atmospheric pressure. Lower temperatures may be used but the reaction period is substantially extended at lower temperatures and there appears to be no notable improvement in color of the final product obtained by operating at lower temperatures. Within the range of 95–100° C., the primary esterification step may be completed within a period of 60 minutes if 25% excess 20° Bé. acid is used, whereas 75 minutes are required if only 15% excess 20° Bé. acid is used. Concentrated acids have given, in all cases, the highest yield in the minimum time. Acid concentrations have varied from 18% to 37% of hydrogen chloride, the preferred concentration being within the range of 28%–36%. As the concentration of the acid is reduced, the loss of aconitic acid in the lower aqueous layer associated with the alkaline earth chloride increases, and the rate of the reaction is slower. 20° Baumé acid (31.5% concentration hydrochloric acid) gives satisfactory results, particularly when used at 15% to 25% excess. With this concentration of acid, and using 15% excess thereof, the aconitic acid content of the lower alkaline earth chloride layer is 0.3% or approximately 1% of the total quantity present in the starting material.

The hydrochloric acid may be used in quantities ranging from 98–150% theoretical. Use of the acid in quantities within the range of 90%–110% of theoretical, gives rise to lower yields and slower reaction. When the quantity of acid used is from 110%–150% theoretical, satisfactory yields and quality products are obtained, but unless the acid has a concentration of at least 28%, the reaction tends to be slow. In general hydrochloric acid should be used in an excess of 15%–25% thereby giving satisfactory yields and greatly increasing the percentage of esterification obtained in the primary esterification step. As the concentration of the hydrochloric acid increases toward 36% concentration, a lower excess of acid is needed to accomplish equally satisfactory results.

There is little loss of alcohol to the lower aqueous layer in the primary esterification step and only a slight excess need be allowed for loss at this point. This holds true for alcohols containing four or more carbon atoms, but the propyl-alcohols tend to dissolve to a greater extent in the lower layer and a greater excess must be allowed to cover this loss when one of these alcohols is used.

When the hydrochloric acid is added to a suspension of the aconitate in the alcohol, it is then necessary to supply approximately 50% excess of alcohol to give a workable solution. However, when the preferred method of preparing the charge is followed wherein the mineral acid and alcohol (and toluene or other hydrocarbon solvent, if used) are first mixed and the aconitate added thereafter, a satisfactory working solution and good yields can be obtained with only 15%–25% alcohol in excess of theoretical. Low excesses of alcohol, particularly where toluene or other hydrocarbon solvents are used, greatly assist in the separation into layers in the separation Step 3. In general, 15%–25% excess alcohol should be used, and this excess is recovered for reuse in distillation Step 7.

The process of the present invention may be practiced with primary alcohols containing from 3 to 12 carbon atoms and ranging in molecular weights from 60 to 186.3. However, alcohols containing from 4 to 6 carbon atoms give the best results. Somewhat lower yields are obtained with normal propyl-alcohol and this is probably due to its solubility in aqueous alkaline earth chloride solutions. The primary esterification step tends to be slow when octyl and higher alcohols are employed, and this may possibly be due to the limited solubility of aconitic acid in these higher alcohols.

Although it is not essential to use hydrocarbon solvent, such as toluene, in the process, it is highly advantageous to do so, primarily for the purpose of improving layer separation and reducing the excess of alcohol required. Hydrocarbons that boil within the range of 65–150° C. are satisfactory, and this group includes aromatics such as benzene, toluene, the xylenes, and saturated aliphatics such as heptanes, octanes and nonanes or petroleum hydrocarbon mixtures boiling in this range. All saturated aliphatic hydrocarbons and all aromatic hydrocarbons (except styrene) boiling in this range are workable. The quantity in which the hydrocarbon solvent is used is not critical, and the desirable concentration for any particular solvent can readily be determined. However, when toluene is used desirable results are obtained when it is used in a quantity equal to about 50% by weight of the aconitate in the charge.

STEP 3.—LAYER SEPARATION

After the primary esterification step, the reaction mixture is ready for layer separation. Basic separation is rapid with most of the acid insoluble material forming an intermediate layer between the lower aqueous layer and the upper alcoholic layer. When GW aconitate is used as the raw charged material, approximately two thirds of the acid insoluble is at the interface at the top of the aqueous layer and by careful control, most of the acid insoluble material may be drawn off along with the bottom layer. With other raw aconitates, filtration (i. e. Step 2) is usually necessary in order satisfactorily to separate the mixture into layers since a good part of the acid insoluble material remains in the top alcoholic layer. The acid insolubles hold relatively large amounts of water containing salts, thus giving difficulty in the esterification Step 4 unless removed. After filtration, the two layers separate quickly and cleanly and it is generally desirable to employ the filtration Step 2 prior to the separation Step 3.

In some runs, separation was accomplished by first drawing off as much as possible of the homogeneous top and bottom layers of the mass discharged from Step 1, and then the heterogeneous middle section or intermediate layer was centrifuged. However, aconitates with large amounts of acid insoluble matter tend to make separation slow and incomplete, thus leaving considerable water and calcium chloride in the top layer. Removal of this acid insoluble mass before settling avoids this difficulty.

When 50% excess n-butyl alcohol is used in Step 1 and toluene is used in a quantity equal to 50% of the weight of the raw aconitate in the charge, the top layer contains about 0.3% alkaline earth chlorides, either when allowed to layer or when filtered. Reducing the excess of alcohol reduces the chloride content of the top layer. The acidity of the top layer averages the equivalent of 9.0 cc. of N/4 NaOH per cc. of sample. Acidity of the bottom layer averages 2.5 cc. N/4 NaOH, when 15% excess 20° hydrochloric acid is used, and the acidity averages about 6.0 cc. of N/4 NaOH cc. when 25% excess 20° Baumé hydrochloric acid is used.

The specific gravity of the top layers varies from .90 to .99, the higher value being obtained using no toluene and using only a small excess of alcohol. Specific gravity of the lower layer varies within the range of about 1.25 to 1.35, depending upon the concentration of the mineral acid, the excess of mineral acid used, and the type of raw aconitate in the reaction vessel charge. These specific gravities are measured at 25–30° C.

STEP 4.—SECONDARY ESTERIFICATION

The toluene, or other hydrocarbon solvent, not only promotes better layering in Step 3, but it has also been found to lessen darkening of the ester during esterification and to increase the rate of water removal. It has been found that during the esterification an amount of toluene should preferably be present which is equal to approximately 50% by weight of the original raw aconitate. If this amount of toluene is not initially present from Step 1, it is desirable that sufficient toluene be added to raise the quantity up to this amount. Due to the increase in the speed of water removal in the presence of toluene, the esterification temperature can be lower and the time of the esterification reaction can be shortened. Both of these factors tend toward a better colored product, i. e. one that is lighter in color.

It is preferred to use from 1% to 2% of 95% strength sulphuric acid as the acidic catalyst for the esterification reaction. Usually, the esterification reaction takes approximately 75 minutes from the time refluxing starts until the reaction is practically complete. The reaction is very slow at the end and for economic reasons it is not usually desirable or advantageous to carry the reaction to ultimate completion. Based on the initial weight of raw aconitate, approximately 9 to 15% by weight of water will be given off in the esterification reaction.

The process has been carried out in the absence of toluene or other hydrocarbon solvents. However, clear separation is not so good in Step 3 and in the esterification reaction, Step 4, there is increased darkening of the ester and water removal is slow.

In place of the concentrated sulphuric acid, other conventional esterification catalysts may be used such as phosphoric acid, dry hydrochloric acid (i. e. hydrogen chloride), toluene sulfonic acid, and acid salts such as $KHSO_4$. However, concentrated sulphuric acid is the preferred acidic catalyst. The esterification can be completed without the addition of catalyst, especially with the higher molecular weight alcohols, by employing higher temperatures and longer reaction times, as well known in the art.

STEP 5.—NEUTRALIZATION

NaOH and KOH are equally efficient in removing the colored material after esterification. $Na_2CO_3$ and $K_2CO_3$ and the corresponding bicarbonates, have a lower degree of efficiency in removing color. $NH_4OH$ and $Ca(OH)_2$ neutralize acidity, but are not as effective as color removers. Hence, NaOH is for practical purposes the preferred neutralizing agent, although one or more of the others listed may be used, particularly KOH.

When the esterification is carried out to the usual and practical limits, ordinarily 6% to 12% by weight of the original crude aconitate is the amount of 20% strength caustic soda which is required for neutralization. When the esterification is carried more nearly to completion, from 3½ to 6% of the 20% strength caustic is required.

The weight of sludge obtained during neutralization usually varies from 110% to 170% of the weight of the 20% strength NaOH solution used. Some settling difficulties may be encountered at this stage as the dark oily sludge tends to stick to the sides of the equipment. It is necessary that the alkali and the dark sludge be removed from the top layer before the distillation Step 7 as otherwise darkening occurs during the solvent distillation.

Additional alkaline washings have been tried, but none after the second wash appears to be very effective and even the second washing removes only little color.

The amount of NaOH solution required for neutralization may be one determined by first titrating some of the cooled solution from the esterification step thereby ascertaining the acidity of the material. Neutralization has been accomplished with the calculated amount of alkali and with excesses of 25%, 50% and 100%. Treatment with excess alkali gives a lighter colored product, but excess alkali must be removed from the neutralized solution before solvents are distilled as otherwise excessive darkening will occur during the solvent removal due to the presence of the alkali.

Good layering between the sludge layer and the upper ester layer is promoted in the neutralization step by the presence of a minimum amount of alcohol and an excess of toluene.

STEP 7.—DISTILLATION

The solvent distillation is carried out by heating the material in the still to a temperature within the range of 130–140° C. at atmospheric pressure, followed at the end by reduction in pressure to effect complete removal of the solvent. The yield of crude ester averages from 95% to 99% of the theoretical based on the aconitic acid content of the crude or raw alkaline earth aconitate.

STEP 8.—DECOLORIZATION

After the alcohol and hydrocarbon solvents are removed from the ester in Step 7, the crude ester generally has a poor (i. e. dark) color. Depending, primarily, upon the preceding treatment and the nature of the crude aconitate, this color varies from a dark red to almost black. This coloration is preferably removed or at least very materially reduced before the ester is used as a plasticizer. As pointed out above in connection with the flow sheet, the decolorization may be accomplished either by vacuum distillation or by use of decolorization agents. In general, it has been found that the vacuum distillation gives much better results than those generally obtained with decolorizing agents such as clay, activated carbon, activated alumina and oxidizing agents. When ion exchange materials were used for decolorizing, the results were not found to be favorable.

The process described above in connection with the flow sheet wherein the preparation of the tri-n-butyl ester of aconitic acid is prepared, may also be used without substantial modification for the preparation of the corresponding isobutyl alcohol and primary amyl alcohol esters.

The trihexyl esters of aconitic acid can also be prepared by the same general procedure described in connection with the accompanying flow sheet, but it is preferable in this case to continue the digestion step for a longer heating period and preferably with 25% to 50% excess of concentrated acid (e. g. 30% or above). These conditions result in a greater degree of esterification of the aconitic acid in the digestion step. This is important in the case of the tri-hexyl esters since the free aconitic acid has decreasing solubility in the higher alcohol, and therefore the digestion step must be prolonged to the point where the residual aconitic acid is soluble in the solvent mixture. Otherwise, loss of aconitic acid due to precipitation occurs on cooling during the layer separation. A 50% excess of hexyl alcohol assists in preventing precipitation of aconitic acid.

The following tables contain data which serve further to illustrate the nature and scope of the invention. The table headings indicate the nature and purpose of the data in each instance.

*Table II.—Degree of esterification obtained with n-butyl alcohol and Godchaux alkaline earth aconitate under various conditions in Step 1*

| Run No. | Percent Excess Alcohol | Percent Excess HCl | Strength of HCl | 90–100° C. Heating Time | Percent Esterification |
|---|---|---|---|---|---|
| | | | Percent | | |
| 1396 | 50 | −10 | 36 | 1 hour | 44 |
| 1388 | 50 | 0 | 36 | do | 44 |
| 1372 | 50 | 5 | 36 | do | 45 |
| 1353 [1] | 50 | 15 | 36 | do | 56 |
| 1347 | 75 | 15 | 36 | do | 69 |
| (No Toluene in Above Runs) | | | | | |
| 1377 [2] | 50 | 15 | 31.5 | 90 minutes | 61 |
| 1382 [2] | 50 | 50 | 31.5 | 75 minutes | 75 |
| 1443 [2] | 25 | 25 | 31.5 | do | 64 |
| 1390 [2] | 10 | 15 | 31.5 | 60 minutes | 59 |
| 1345 | 50 | 12.5 | 20 | 90 minutes | 38 |

[1] The temperature of this run was maintained at 80°–90° C.
[2] Toluene in runs 1377–82–90 and 1443 equivalent to .5 of alkaline earth aconitate used.

*Table III.—Degree of esterification obtained with different alcohols in Step 1 at 90–100° C.*

| Run No. | Alcohol | Percent Excess Alcohol | Percent Excess HCl | Strength of HCl | Heating Time | Esterification |
|---|---|---|---|---|---|---|
| | | | | Percent | | Percent |
| 1363 [1] | Ethyl | 100 | 105 | 36 | 1 hr | |
| 1360 | n-Propyl | 87.5 | 15 | 36 | 80 min | 58 |
| 1366 | Iso-Butyl | 50 | 25 | 36 | 75 min | 75 |
| 1355 | n-amyl | 12.5 | 15 | 36 | do | 55 |
| 1359 | Iso-amyl | 37.5 | 15 | 36 | do | 58 |
| 1398 [2] | hexyl | 50 | 25 | 31.5 | 3.5 hrs | 80 |

[1] No layering was obtained so degree of esterification was not determined.
[2] Hexyl alcohol used was 2 ethyl butanol.

*Table IV.—Yields of crude butyl ester obtained under various conditions based on aconitic acid content of alkaline earth aconitate*

| Alkaline Earth Aconitate | Percent Excess Alcohol | Percent Excess Acid | Strength of HCl | Toluene Alkaline E. A. Ratio | Crude Yield |
|---|---|---|---|---|---|
| | | | Percent | | Percent |
| GW | 110 | 12.5 | 36 | none | 96 |
| GW | 50 | 15 | 36 | none | 95 |
| GW | 20 | 15 | 36 | none | 98 |
| GW | 25 | 25 | 31.5 | none | 93 |
| GW | 50 | 50 | 31.5 | none | 98.6 |
| G | 25 | 25 | 31.5 | .5 | 99.1 |
| G | 25 | 25 | 31.5 | .5 | 93.6 |
| G | 25 | 25 | 31.5 | .5 | 99.3 |
| S. C | 25 | 25 | 31.5 | .5 | 86 |
| G | 50 | 12.5 | 20 | none | 42.5 |

Instead of using hydrochloric acid in Step 1, as previously described, in connection with the accompanying flow sheet, it has been found that good results may also be obtained by the use of sulphuric acid as the mineral acid in this step. The following example illustrates one preferred method of practicing the invention using sulphuric acid in the primary esterification step.

EXAMPLE II

A three-necked flask is equipped with a thermometer, an agitator and reflux condenser. 200 gms. of alkaline earth aconitate containing the equivalent of 56% aconitic acid were suspended in 214 gm. of N-butyl alcohol (approximately 50% in excess of theoretical) and 298 gms. of 48% sulfuric acid (approximately 93% in excess of theoretical) are added slowly with agitation. The reaction mixture is heated at 100–103° C. for 60 minutes then 100 cc. of toluene are added and mixture heated for 20 minutes at 96° C.

The mixture is then cooled to room temperature and filtered. The precipitated salts are washed twice with small quantities of butyl alcohol and added to the filtrate. The filtered mixture is then placed in a separatory funnel and allowed to separate into two layers. The lower aqueous solution (specific gravity 1.3, acidity—1 cc.=30.2 cc. N/4 NaOH) weighing approximately 204 gms. is drawn off and discarded. This lower layer contains magnesium sulfate, small quantities of calcium sulfate, excess sulfuric acid, water and small quantities of alcohol and aconitic acid. The upper layer weighing 367 gms. (specific gravity 0.93, acidity—1 cc.=5.9 cc. N/4 NaOH) is added to a reaction flask equipped with a thermometer and a condenser and device for removing the condensed water vapors from the reaction mixture. 1 cc. of 95% sulfuric acid is added. The mixture is heated and water withdrawn until the flask contents temperature rises to 128–130° C. The reaction requires 70–90 minutes. At the end of this reaction period a sample of the reaction flask titrates as follows: 2 cc.=1.877 gms.=1.4 cc. N/4 NaOH. 19 cc. of water are withdrawn from the water-withdrawal device during the reaction. After cooling, the mixture weighing 340 gms. is placed in a flask equipped with an agitator and 20 gms. of 17% NaOH solution (34% in excess of quantity determined by above titration) are added slowly. The mixture is agitated five minutes and is then transferred to a separatory funnel and allowed to stand two hours. A dark colored sludge (28 gms.) collects or separates as a lower layer is discarded. The upper layer is added to a distilling flask and the toluene and unreacted alcohol solvents are recovered therefrom by distillation. The condensed solvents can be reused in the next run.

The crude ester weighing 217 gms. (98.6% of theoretical) is then distilled under reduced pressure and 203 gms. of distilled ester are obtained. The product obtained is essentially the tri-n-butyl ester of aconitic acid.

When sulphuric acid is used in the primary esterification step, the resultant material does not handle the same way with respect to filtration and layering as does the reaction mass obtained when hydrochloric acid is used for digestion. When sulphuric acid is used, a precipitate of calcium sulphate forms and interferes with the layering of the reaction mass. When 95% sulphuric acid is used, and the reaction mass is filtered to remove the calcium sulphate, the resulting filtrate has only one layer. The precipitated calcium sulphate appears in some way to hold onto the water and other materials in the aqueous solution and thereby causes considerably lower yield unless the precipitate is further treated. However, the ultimate product (aconitic acid ester) obtained using sulphuric acid in the digestion step is comparable in quality to that obtained with hydrochloric acid. A good yield of the ester (about 90%) can be obtained if 80% excess of 65% strength sulphuric acid is used. The excess acid in the water layer represses the solubility and consequent loss of the aconitic acid in this lower water layer. The excess of acid thus used apparently does not result in formation of butyl sulphate, since the final product upon hydrolysis is found to contain only traces of sulphate. The final product is the same color as that obtained by the use of hydrochloric acid in the digestion step.

The concentration of sulphuric acid used in the primary esterification step may range from 45% upward, and good yield and results are obtained using 65–95% strength acid in excess.

It will be understood that instead of using in the process a single alcohol having from 3 to 12 carbons, a mixture of two or more alcohols may be used, in which case mixed aconitic esters will be obtained. Likewise, instead of utilizing a single hydrocarbon solvent, e. g. toluene, a mixture of two or more of the useful class of solvent may be used if found to be advantageous. Similarly, a mixture of acidic esterification catalysts may be used if desired.

Obviously, certain further changes may be made in the foregoing processes and different embodiments of the invention may be adopted by those skilled in the art without departing from the spirit and scope thereof. Accordingly, it is intended that all matter described above shall be interpreted as illustrative and not in a limiting sense.

What is claimed is:

1. The process of preparing esters of aconitic acid from alkaline earth aconitates which comprises, in combination, heating alkaline earth aconitate with a mixture of an acid selected from the group consisting of sulfuric acid and hydrochloric acid and a primary alcohol containing from 3 to 12 carbon atoms thereby effecting formation of aconitic acid and partial esterification thereof and forming an alkaline earth salt of said mineral acid, mechanically separating the solution of aconitic acid and aconitic ester in said alcohol from the remainder of the reaction mass, substantially completely esterifying the free aconitic acid, and recovering the aconitic ester.

2. The process of preparing esters of aconitic acid from alkaline earth aconitates which comprises, in combination, heating an alkaline earth aconitate with hydrochloric acid and a primary alcohol containing from 3 to 12 carbon atoms thereby effecting formation of aconitic acid and partial esterification thereof and forming an alkaline earth chloride, mechanically separating the solution of aconitic acid and aconitic ester in said alcohol from the remainder of the reaction mass, substantially completely esterifying the free aconitic acid, and recovering the aconitic ester.

3. The process of preparing esters of aconitic acid from raw alkaline earth aconitates which comprises: preparing a mixture of hydrochloric acid having a strength of 18–37%, a primary alcohol containing from 3–5 carbon atoms, and toluene and adding to said mixture raw alkaline earth aconitate, said mixture containing from 15–25% excess of the theoretical amount of said hydrochloric acid required to hydrolyze the aconitate, an excess of from 15–25% of the theoretical amount of said alcohol required completely to esterify the aconitic acid content of said aconitate, and an amount of toluene equal to approximately 50% by weight of said aconitate; heating said mixture to a temperature within the range of 90–100° C. for a period sufficient to at least substantially completely hydrolyze said aconitate and at the same time partially esterify the liberated aconitic acid; cooling the reaction mixture to a temperature of about 20–30° C.; filtering the cooled reaction mixture to remove insoluble material therefrom; allowing the reaction mixture filtrate to separate into two layers; separating said two layers; adding approximately 1–2% by weight of 95% $H_2SO_4$ catalyst to the separated upper layer which contains aconitic acid and aconitic ester dissolved in unreacted alcohol and toluene and completing the esterification of said aconitic acid by heating said upper layer to a temperature of from about 90–130° C. and separating water as formed during esterification; neutralizing the esterified mixture with alkali; separating sludge formed during neutralization from the solution; distilling the neutralized solution to remove the toluene and residual alcohol therefrom; and, decolorizing the resulting crude ester by vacuum distillation.

4. The process of preparing esters of aconitic acid from raw alkaline earth aconitates which comprises: first preparing a mixture of hydrochloric acid having a strength of 30–36%, a hexyl alcohol, and toluene and adding to said mixture raw alkaline earth aconitate, said mixture containing from 25–50% excess of the theoretical amount of said hydrochloric acid required to hydrolyze the aconitate, an excess of approximately 50% of the theoretical amount of hexyl alcohol required completely to esterify the aconitic acid content of said aconitate, and an amount of toluene equal to approximately 50% by weight of said aconitate; heating said mixture to a temperature within the range of 85° C. to 150° C. for a digestion period sufficient to at least substantially completely hydrolyze said aconitate and also to esterify the aconitic acid sufficiently that all of the un-esterified aconitic acid is soluble in the presence of the ester formed; cooling the reaction mixture to a temperature of about 20–30° C.; filtering the cooled reaction mixture to remove insoluble material therefrom; allowing the reaction mixture filtrate to separate into two layers; separating said two layers; adding approximately 1 to 2% by weight of 95% $H_2SO_4$ catalyst to the separated upper layer which contains aconitic acid and aconitic ester dissolved in unreacted alcohol and toluene and completing the esterification of said aconitic acid by heating said upper layer to a temperature of about 85° C. to 150° C. and separating water as formed during esterification; neutralizing the esterified mixture with alkali; separating sludge formed during neutralization from the solution; distilling the neutralized solution to remove the toluene and residual alcohol therefrom; and, decolorizing the resulting crude ester by vacuum distillation.

5. The process of preparing esters of aconitic acid from raw alkaline earth aconitates which comprises heating alkaline earth aconitate with a mixture of sulphuric acid and a primary alcohol containing from 3 to 12 carbon atoms thereby effecting formation of aconitic acid and partial esterification thereof and formation of a precipitate of alkaline earth sulfate, removing the precipitate as well as any acid insoluble material associated with said aconitate from the reaction mass, removing any aqueous layer which may separate from the filtrate, substantially completely esterifying aconitic acid in the water-free filtrate, neutralizing the esterified solution, and recovering aconitic ester from the neutralized solution.

6. The process called for in claim 5 wherein sulfuric acid having a concentration of at least 45% is used in excess.

7. The process called for in claim 5 wherein said aconitic ester is recovered by distilling off said alcohol from the ester and then vacuum distilling the crude ester and condensing the distillate consisting of at least substantially pure ester.

8. The process of preparing n-butyl ester of aconitic acid from raw alkaline earth aconitates which comprises, preparing a reaction mixture containing crude alkaline earth aconitate suspended in N-butyl alcohol and 48% strength sulfuric acid, the N-butyl alcohol being present in an amount equal to about 50% in excess of that required completely to esterify the aconitic acid content of said crude aconitate and the sulfuric acid being present in an amount equal to about 93% in excess of that required completely to react with said crude aconitate, heating said reaction mixture to about 100 to 103° C. for approximately sixty minutes admixing toluene with the reaction mixture in an amount equal to about 43% by weight of said crude aconitate, heating the resultant mixture at about 96° C. for approximately twenty minutes, cooling the mixture to approximately room temperature, filtering the cooled mixture, allowing the filtrate to stratify into two layers, separating the upper layer consisting principally of a solution of aconitic acid and aconitic ester dissolved in toluene and excess N-butyl alcohol, adding a minor amount of 95% $H_2SO_4$ to said solution of aconitic acid and aconitic ester, heating said solution and removing water driven off therefrom until the flash contents temperature reaches from 128 to 130° C. thereby substantially completing the esterification reaction, neutralizing the esterified mixture with alkaline material, separating the neutralized solution from any sludge which may settle out therein, distilling the remaining neutralized solution to remove the toluene and any residual N-butyl alcohol, and, decolorizing the resulting crude ester by vacuum distillation.

9. The process of preparing esters of aconitic acid from alkaline earth aconitates which comprises in combination heating alkaline earth aconitates with a mixture of hydrochloric acid and a primary alcohol containing from 3 to 12 carbon atoms thereby effecting the formation of aconitic acid and partial esterification thereof and formation of alkaline earth chloride, said hydrochloric acid having a concentration of 18–37%, the alcohol-acid mixture containing from 15–25% excess of the theoretical amount of acid required to hydrolyze the aconitate, and an excess of from 15–25% of the theoretical amount of alcohol required completely to esterify the aconitic acid content of said aconitate, mechanically separating the solution of aconitic acid and aconitic ester in said alcohol from the remainder of the reaction mass, substantially completely esterifying the free aconitic acid, and recovering the aconitic ester.

10. The process of claim 3 where the alcohol is butyl alcohol.

HOWARD F. REEVES, Jr.

References Cited in the file of this patent

UNITED STATES PATENTS

| Number | Name | Date |
|---|---|---|
| 2,290,926 | Weisberg et al. | July 28, 1942 |
| 2,390,140 | Weisberg et al. | Dec. 4, 1945 |
| 2,406,648 | Weisberg et al. | Aug. 27, 1946 |
| 2,434,300 | Weisberg et al. | Jan. 13, 1948 |

FOREIGN PATENTS

| Number | Country | Date |
|---|---|---|
| 415,472 | Great Britain | Aug. 27, 1934 |
| 171,835 | Germany | June 25, 1906 |

OTHER REFERENCES

Groggins: "Unit Processes in Organic Synthesis," third ed., (McGraw-Hill; New York; 1947), pp. 624, 625, 626 and 629.